US009639448B2

(12) United States Patent
Gebhard et al.

(10) Patent No.: US 9,639,448 B2
(45) Date of Patent: May 2, 2017

(54) MULTI-VERSION SYSTEMS FOR ZERO DOWNTIME UPGRADES

(71) Applicants: Markus Gebhard, Walldorf (DE); Andreas Jahr, Walldorf (DE); Wolfgang Degenhardt, Walldorf (DE); Volker Driesen, Heidelberg (DE); Nicolai Jordt, Bad Langbrücken (DE); Oleg Koutyrine, Walldorf (DE)

(72) Inventors: Markus Gebhard, Walldorf (DE); Andreas Jahr, Walldorf (DE); Wolfgang Degenhardt, Walldorf (DE); Volker Driesen, Heidelberg (DE); Nicolai Jordt, Bad Langbrücken (DE); Oleg Koutyrine, Walldorf (DE)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 13/929,513

(22) Filed: Jun. 27, 2013

(65) Prior Publication Data

US 2015/0007159 A1 Jan. 1, 2015

(51) Int. Cl.
*G06F 11/36* (2006.01)
*G06F 9/445* (2006.01)

(52) U.S. Cl.
CPC ............. *G06F 11/36* (2013.01); *G06F 8/67* (2013.01)

(58) Field of Classification Search
None
See application file for complete search history.

(56) References Cited

U.S. PATENT DOCUMENTS

| | | | |
|---|---|---|---|
| 6,304,882 B1 * | 10/2001 | Strellis et al. | |
| 6,385,770 B1 | 5/2002 | Sinander | |
| 6,851,105 B1 * | 2/2005 | Coad | G06F 8/20 717/106 |
| 6,938,039 B1 | 8/2005 | Bober et al. | |
| 7,155,462 B1 | 12/2006 | Singh et al. | |
| 7,447,940 B2 * | 11/2008 | Peddada | G06F 11/2025 709/223 |
| 7,757,226 B2 | 7/2010 | Srivastava et al. | |
| 8,140,644 B2 | 3/2012 | Hagale et al. | |
| 8,200,634 B2 | 6/2012 | Driesen et al. | |
| 8,326,800 B2 | 12/2012 | Cunningham et al. | |

(Continued)

OTHER PUBLICATIONS

Cecchet et. al, "C-JDBC—Flexible Database Clustering Middleware", Usenix 2004, pp. 1-10.*

(Continued)

*Primary Examiner* — Tuan Dao
(74) *Attorney, Agent, or Firm* — Mintz Levin Cohn Ferris Glovsky and Popeo, P.C.

(57) ABSTRACT

An upgrade procedure for an application system without downtime is presented. The upgrade procedure includes a mix of a rolling upgrade of application servers, shadow systems, and record and replay mechanisms that employ transformation and locking, for the upgrade of the applications on the application system. Application servers are upgraded one after another. A target version of the system is simultaneously added to the original system and a shadow, or target, system. Data changes are not only carried out in the original system, but are also carried out in the target system, so that a customer realizes no downtime for their data requests to the applications.

12 Claims, 4 Drawing Sheets

(56) References Cited

U.S. PATENT DOCUMENTS

| | | | |
|---|---|---|---|
| 8,356,010 B2 | 1/2013 | Driesen | |
| 9,021,448 B1* | 4/2015 | Gagliardi | G06F 8/70 |
| | | | 717/128 |
| 2006/0225062 A1* | 10/2006 | Lamb | G06F 9/541 |
| | | | 717/162 |
| 2006/0282697 A1 | 12/2006 | Sim-Tang | |
| 2006/0291507 A1* | 12/2006 | Sarosi | H04N 21/431 |
| | | | 370/493 |
| 2007/0255977 A1 | 11/2007 | Liccione et al. | |
| 2007/0271365 A1* | 11/2007 | Revanuru | G06F 17/30 |
| | | | 709/223 |
| 2008/0098046 A1 | 4/2008 | Alpern et al. | |
| 2009/0049421 A1* | 2/2009 | Meijer | G06F 9/4426 |
| | | | 717/100 |
| 2010/0088281 A1* | 4/2010 | Driesen et al. | 707/641 |
| 2010/0138821 A1 | 6/2010 | Driesen et al. | |
| 2011/0066786 A1 | 3/2011 | Colbert | |
| 2012/0030172 A1* | 2/2012 | Pareek et al. | 707/635 |
| 2012/0030184 A1 | 2/2012 | Driesen et al. | |
| 2012/0036165 A1 | 2/2012 | Driesen et al. | |
| 2012/0239616 A1* | 9/2012 | Cunningham et al. | 707/620 |
| 2012/0284709 A1* | 11/2012 | Lorenc | G06F 9/45558 |
| | | | 718/1 |
| 2013/0054523 A1* | 2/2013 | Anglin et al. | 707/624 |
| 2014/0101652 A1* | 4/2014 | Kamble et al. | 717/171 |

OTHER PUBLICATIONS

Sharpe, "Develop Simpler_WebLogic Clusters and Singleton Service", Mar. 2012.*

* cited by examiner

MULTI-VERSION SYSTEMS FOR ZERO DOWNTIME UPGRADES

TECHNICAL FIELD

The subject matter described herein relates to database applications, and more particularly to achieving zero downtime during system upgrades while keeping memory and CPU consumption low.

BACKGROUND

An upgrade is the procedure to transform a productive software system from one major software version to a newer version. As shown in FIG. 1, the system 100 includes one or more application core servers 102. Each core server 102 hosts sessions and runs services and applications (short: programs). Sessions are initiated from outside of the system. A core server infrastructure 104 routes the incoming request to an application server of the core servers 102, which then creates the session. Subsequent requests in the context of the session will be routed to the same core server 102. New requests without session will be distributed again to one of the core servers.

It can be assumed that the systems expose singletons, which are programs that can only run once throughout the entire system (regardless of the number of core servers) since they rely on unique data kept in memory local to a core server. Upgrades depend heavily on the classification of data in a database 106. For the upgrade there is a need to classify the data in the database 106 along multiple orthogonal dimensions.

Along the functional dimension, the data can be classified as follows:
- program data (short: data): comprising all data created by the programs' operation incl. master data
- Configuration: business configuration (customizing) and technical configuration. Insomuch as master data influences the functional behavior/flow of programs and thus behaves like configuration, master data may also be classified as configuration.
- Code: code of programs (services and applications) including generated code. This is the data interpreted by the core server and maybe even services in order to actually run the program Code and configuration data are combined into an empty, but runnable program. This means that the program can run without errors and provide the functionality it was designed for with program data tables basically being empty. The term data as used herein also includes the data structures (e.g. table layouts, DDIC entries).

Along the upgrade-impact dimension the data can be classified as follows:
- To-remain-unchanged data: Data that is kept without change imposed by the upgrade.
- To-Be-Changed data: Data that needs to be transformed by the upgrade. In general, change is associated with physical changes such as structural changes (i.e. differing table layout), exchanging or altering data (i.e. exchange old with new code or replacing a default value, deleting old and adding new example data, . . . ). For the upgrade it is important to understand that also semantical or logical changes play a non-neglectable role. Semantical changes manifest in the worst case such that even physically unchanged data is interpreted differently by original and target programs and therefore have to be treated as changed data during upgrade in order to avoid inconsistencies when reading and writing to the data.

Along the changeable-by-customer dimension the data can be classified as follows:
- Unchangeable data: Data delivered by a system provider, such as SAP, that cannot be changed by a customer (in general this is code)
- Changeable data: Data delivered by the system provider that is changed by the customer (e.g. configuration entries)
- Customer-created data: Data that is perceived as singletons by the upgrade since they have solely been created by the customer (e.g. business data entered by means of the various applications). The data is singleton since the consistency of the business operation of the system assumes no copies of individual data records.

Conventional upgrades, however, always require interruption of all end user work, leading to business and technical downtime perceived by the end user while keeping the central processing unit (CPU) and memory consumption low.

SUMMARY

This document describes a system and method to achieve full business continuity without business downtime for the end-user. In other words, the end user is capable to continue work even during upgrade of the system. The term "original" is used herein to identify entities of the system of the current version, and the term "target" is used herein for entities of the new version. This is achieved by keeping the additional, upgrade-induced CPU and memory consumption low.

In one aspect, a method, computer program product, and system for upgrading an application system without downtime are presented. The application system has a database and a plurality of original application core servers. The computer program product and system execute a method, which includes creating a target system in a database. The target system has a persistence. The method further includes creating a set of target application servers in the target system. The set of target application servers keeps a sum of original application core servers and target servers constant.

The method further includes locking each of the plurality of original application core servers to prevent configuration changes to the application system, and copying configuration data and application data associated with one of the plurality of original application core servers to the persistence associated with the target system. The configuration data and application data remain accessible from the plurality of original application core servers. The method further includes running each of the set of target application servers after the configuration data and application data associated with an associated one of the plurality of original application core servers is copied and transformed to the persistence associated with the target system. The method further includes distributing new requests to the application system from each of the plurality of original application core servers to one of the target application servers in the target system.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein.

Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, achieve zero downtime during upgrades while keeping memory and CPU consumption low.

Figure 1:
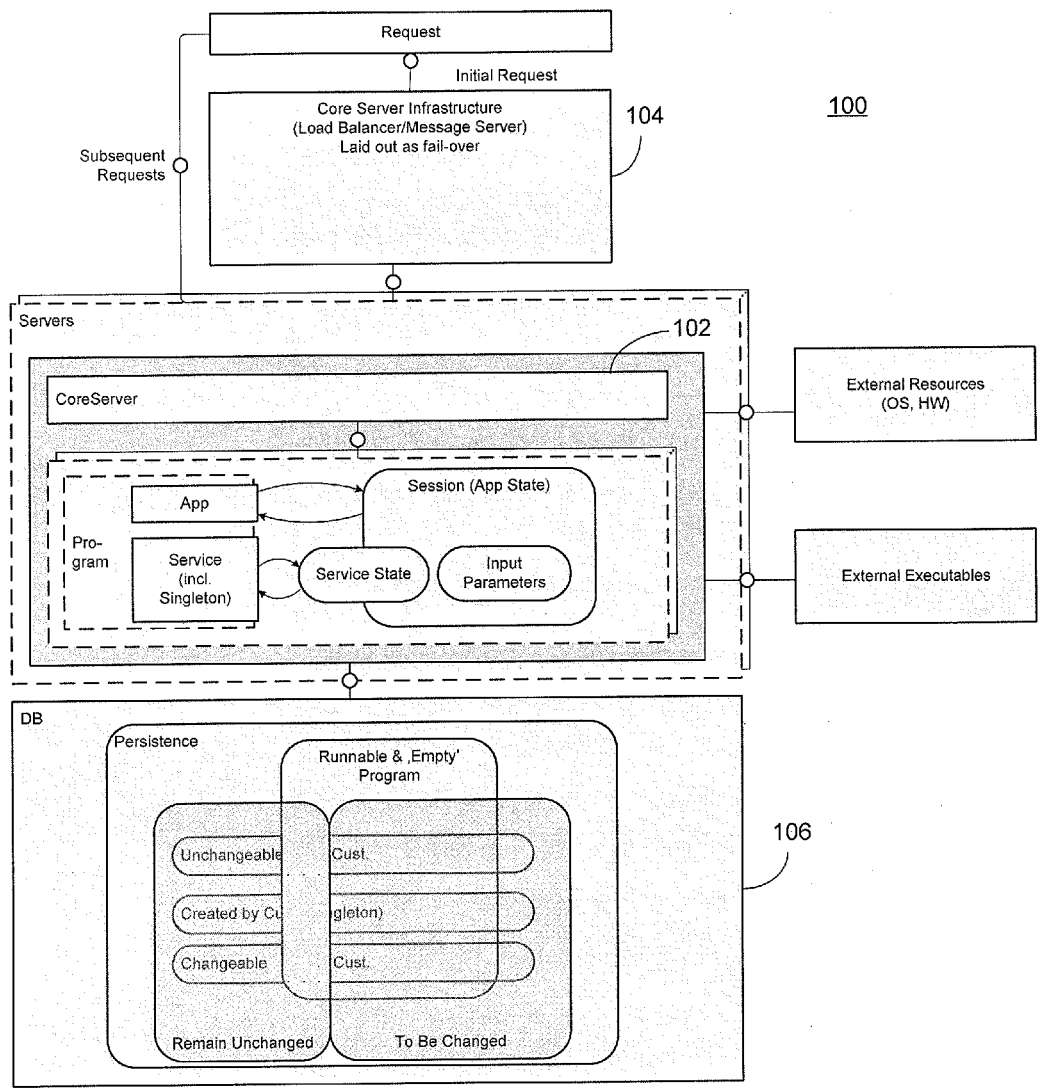
FIG. 1 illustrates a running software system.
Figure 2:
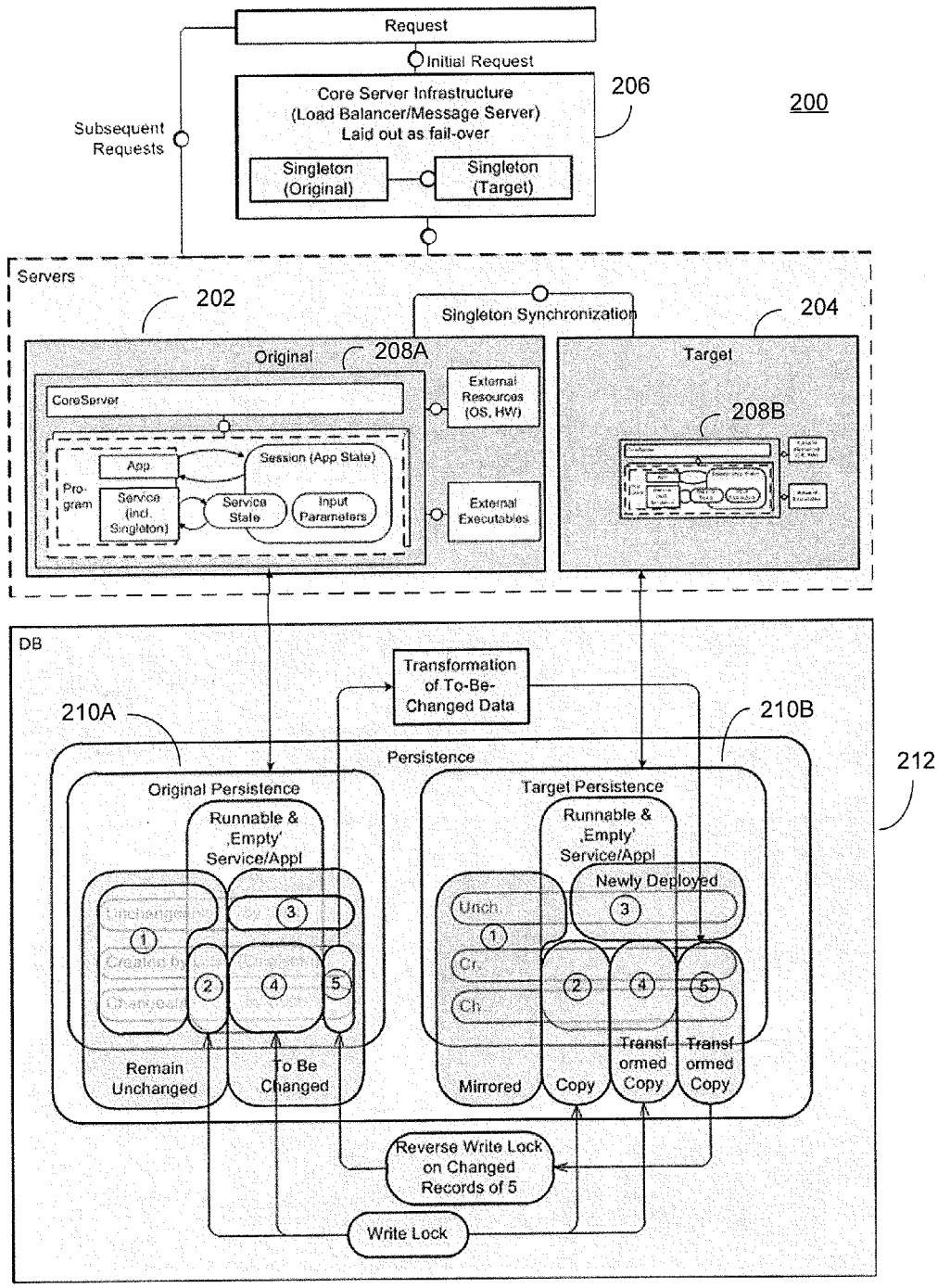
FIG. 2 depicts a system during upgrade.

FIG. 2 depicts an upgrade system 200 that includes an original system 202 architecture in addition to a target system architecture 204. Not all depicted entities are active or existent at all times. There are four main parts of the upgrade system 200 that need to be exchanged during the upgrade: a core server infrastructure 206 (being the façade to the requestors of the system), application servers 208A and 208B (executing the programs), a persistency 210A and 210B (storing the programs and the application data) and a database system 212.

As depicted in FIG. 2, the upgrade system 200 further includes and provides a number of different data sets that are relevant for the upgrade, and which each have unique handling requirements. (Note that the data sets are combinations of the earlier described data classification dimensions.)

1) data that is not changed due to the upgrade that could be read and written both by original and target system. This is in general application transactional data and some unchanged code:

data set 1=(remain unchanged∩unchangeable by customer)∪(remain unchanged∩customer created∩¬program)∪(remain unchanged∩customer changed∩¬program)

2) data that is not changed due to the upgrade but essential for proper execution of a program, it may also be data that controls the execution behavior. This is mainly configuration and master data. This data must not change during the upgrade in order to assure the same behavior of original and target system.

data set 2=(remain unchanged∩customer created∩program)∪(remain unchanged ∩customer changed∩program)

3) data that is subject to change by the upgrade, but cannot be changed by the customer. This is mostly code. This data will be exchanged by the upgrade.

data set 3=(to be changed∩unchangeable by customer)

4) data that is subject to change by the upgrade, is relevant for program execution, but has to be perceived as singleton due to the fact that the customer has created or changed it. During the upgrade it would be copied and transformed according to the new target structures. This data set must also not be changed by the customer during the upgrade in order to keep the same behavior of original and target system. In general this data is master data and configuration.

data set 4=(to be changed∩customer created∩program) ∪(to be changed∩customer changed∩program)

5) data that is subject to change by the upgrade, but not relevant for the program execution. This is transactional data and master data. The data can also be perceived as a singleton due to the fact that the customer has created or changed it. During the upgrade it can be copied and transformed according to the new target structures. This is the most critical data during upgrade, since the customer would expect to still read and write this data during his normal business operation. Any restrictions for read and write have to be applied carefully since then normal work with the system is not possible and the system under upgrade would be perceived as being in business downtime (which is not the purpose of the proposed procedure). In essence, write access to already existing records of this data set by the target system would result in write locks (here called: reverse write locks) to the original system. Any write access to this data set by the original system also requires an instant transformation to its copy at the target persistency.

data set 5=(to be changed∩customer created∩¬program)∪(to be changed∩customer changed∩¬program)

Upgrade of Core Server

Figure 3:
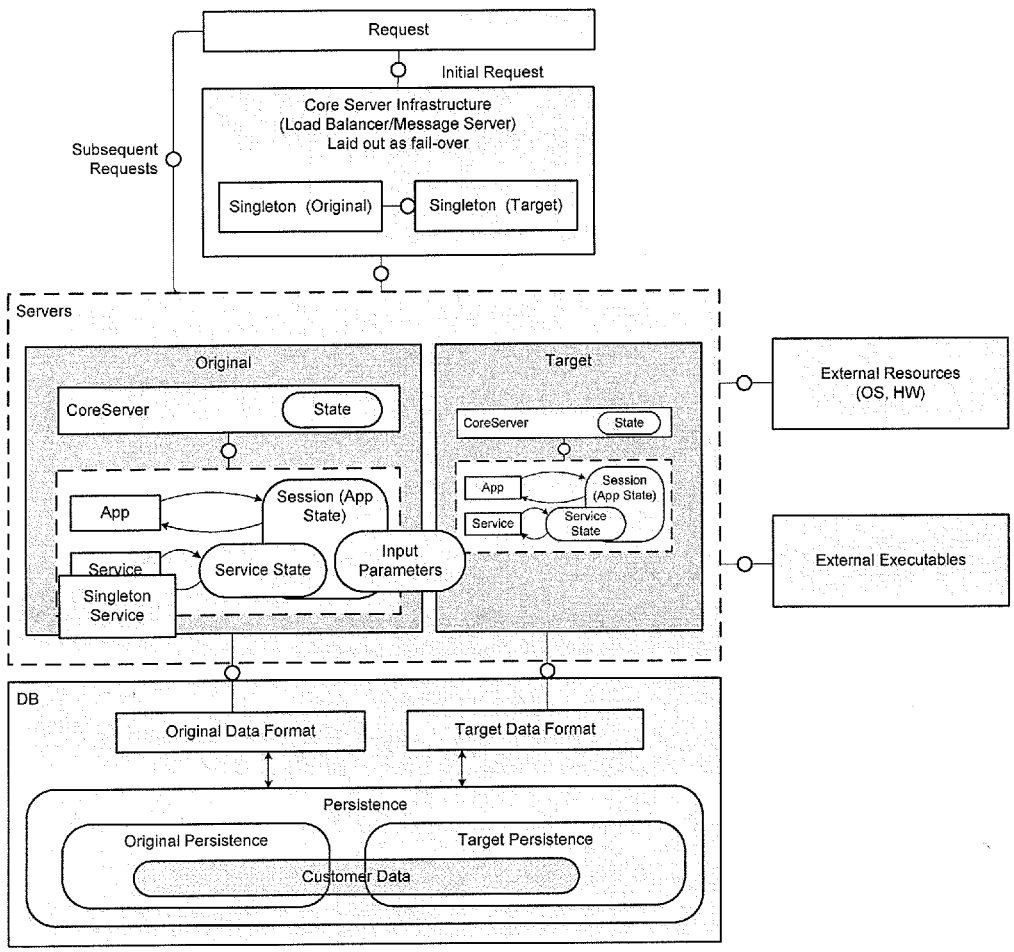
FIG. 3 depicts upgrade of a core server.

With reference to FIG. 3, an upgrade of a the core server will now be described in detail, as well as a rolling upgrade variant that can also be used to upgrade the core server. The upgrade of the core server can be implemented in several ways:

n+1 servers (n original+1 target) (requires additional hardware, but maybe preferable for small number of servers)

n−1+1 server (n−1 original+1 target) (no additional hardware needed, but performance degradation due to one server not available temporarily).

External executables are not relevant for the upgrade (e.g. for start/stop of server in normal operation). It is preferred that the core server infrastructure (perceived as singletons) is available in fail-over mode, and that at least two core servers are expected to run in the system. Requests to the system go initially (at a start of a session) through the core server infrastructure.

It is not possible to initially address the core servers directly, and therefore the core infrastructure needs to have knowledge of sessions or clients in order to understand which request is new to the server and be routed appropriately during the upgrade. If such a mechanism is not available, we have to expect that requests to original servers, which would be down during replacement by a target server, cannot be satisfied.

It is assumed that there are operating system resources (ports, memory, . . . ) to the core server that are singletons and which are not shared by two core servers. External programs attached to application servers can only be attached to one server. It is assumed that these external programs can handle the non-availability of the core server to which they are attached. Finally, disk-space must be available without 'limits', while CPUs and memory are only available in restricted amounts.

If the target data format and persistence are already installed, prepared, and ready to use, the upgrade procedure of the core server can be executed as follows. First, the target server is installed and prepared in parallel to the original server. Next, the core server infrastructure 206 is exchanged. It is assumed that the target core server infrastructure has been installed with the first target core server. Note also that the core-server infrastructure in fail-over layout means that there is an active component and a fail-over component operating in hot-stand-by that takes over as soon as the active component cannot be active for any reason (crash, shut-down, etc.). It appears as a singleton to the clients of the system, and is reachable under one address.

This requires the following steps: shut down the fail-over source component, start the target component (as fail-over component and attach it to the still active source component) in a compatible mode with source component and core servers, and shut down the active original component. Then, the target fail-over component takes over and the fail-over component (in the target version) receives all incoming requests). Now the active target component is started, and the fail-over component is again attached to the active target component and the core server infrastructure is now operating in the target version compatible the original core servers. If fail-over of core server infrastructure components is not available, a short unreachability of the system will occur when the source component is stopped and the target component is started. Still, singletons have to work together with the original and target core server and services.

For the first server, using the above-mentioned n−1+1 server strategy, the target core server is configured according to the original server it shall replace. The original server is then stopped once original services, applications and sessions are depleted (i.e. now new request leading to new sessions or new transactions are accepted, only already begun transactions are finalized). If the original system is only configured with one server, a second core server needs to be added temporarily (i.e., installed in the target version of the system and registered with the core server infrastructure), such that no business downtime appears.

The following steps of an upgrade procedure are independent of any upgrade strategy being used, and the target applications and services have to be prepared in order to test. First, the original servers are tested against target persistence (i.e., according to a new test case), the target core server is tested, and the target and original sessions, applications and services are tested against both persistencies. New requests are then accepted. It may be necessary to also route new requests to source servers if the target server is overloaded. The servers or the singletons of the core infrastructure have to ensure that new requests up for distribution to the servers are only routed to the target core server.

For each n-th core server, the procedure is repeated: the n-th original core server is stopped once depleted (with certain performance degradation due to temporarily missing n-th server), and the n-th target server is started (by connecting/using the same resources) with new services and sessions, and operated on the new persistence.

With each n-th server: a "smoke test," i.e. preliminary tests to determine if there are any basic or simple failures, is performed on the n-th target core server, and server specifics (e.g. attached executables) can also be tested. New requests can thereafter be accepted for each n-th server.

Upgrade of System

In other implementations, an upgrade of an entire system can be accomplished, where the entire system except the core server is in the database. It is assumed that the database system can manage two versions of the schema at a time, and that unchanged data can be consumed from both target and original systems (i.e. applications and services).

Original and target applications and services must be able to be run in parallel on the same customer created data. Thus, they are not running as singletons. If singletons are unavoidable (e.g., number range creation, having only one in-memory state and not synchronizing by means of the database), they must be implemented and consumed as true services (i.e. consumed via lookup and not via reference in the library). Applications using the service will consume it via lookup, and be fault tolerant if the service is not able to return results while being switched over from original to target system.

It is also preferred that customer configuration is "read-only" during the upgrade to avoid that service/application/business processes behavior is changed. Thus coding related to configuration has to accommodate not being able to write to the configuration. This means that target and original system behave semantically the same. In case of correcting a bug the behavior may change also on the semantical level. These semantical changes are not supported, and need to be classified upfront by the applications and their usage is prohibited.

The transformation requires that data can be separated into consistent and thus atomic chunks of data (in the easiest case this is just one record of a table, in more complex cases, the data is chunked into multiple records of one or more tables). These atomic chunks are then also subject to the reverse write lock in order to keep the data semantically consistent even if changed by the target system. In other words, there is a clearly defined and persisted bi-jective mapping between original chunks of data and target chunks of data.

To setup the transformation of the database, new deliveries are installed according to a versioning scheme of the database. For example, HANA by SAP AG has a particular versioning scheme that needs to be adhered to. To establish persistency, target structures can be created according to an alias naming scheme of the database. For instance, some databases do not allow appending an alias name to existing structures. Thereafter, upgrade mode is entered, and configuration changes and modifications are not allowed.

Next, target system that can be run is created. The target system includes data sets that are the intersection set of (Created by Customer+Changed by Customer) and the associated application, as well as customer-specific configuration or generated code. These are provided in the target version format such that the target version of the application can run as configured by the customer. This may include customer modifications and customer code. This type of data should be classified during the application development process, and is preferably read-only during upgrade, given the complexity of keeping consistency (e.g. active code branches, testing, . . . ) of running applications in original and target version. Thus, the target systems behaves the same as the original system, if different behavior is not explicitly intentional and thus mandatorily and automatically introduced by the upgrade. The result is two systems, the original system and a target system without business data, that are ready to be run.

The to-be-changed data that is not part of the empty application (i.e. upgrade data set 5) is copied by transforming that data from the original system to a new data structure. The transformation is carried out one data chunk after the other. The resulting data for the productive systems is then tested.

The target core server next needs to be in place. Reverse write locks for transformed data (data set 5) are added and activated, and the transformation continues as new data is written by the original system. Original singleton services are shut down and the target singleton service is started. Transforming data of data set 5 continues whenever new data is created at the original system. Thereafter, testing of the target system can happen, and the successful execution of which allows new end user requests to be productively served by the new system, while the sessions of the original servers are depleted.

Transformation and Reverse Locking on Data Set 5:

Read/write access of the original and target systems, during the original and target sessions operating in parallel, are as follows. Read access by original services:

Read directly from original data structures;

Forbidden: Read from target data structures Reason: avoidance of semantical inconsistency. Consider a workflow that stretches over time and can lead to semantical inconsistencies (e.g. one step vs. two-step approval). This restriction may not apply to all singleton data that changes structure. There may be simple changes from original to target structure for which such cross-persistency read-access may be possible, but this is an optimization and requires appropriate metadata created by the programming model and accessible to the data base as well as additional testing.

Original sessions may not see data created in target sessions. The risk is that collaboration of users in original and target sessions will not be possible if the data that is subject to the collaboration is created in the target persistency. This is why the session switch based solely on input parameters is important. Users need to be aware of this situation, and can either be notified (i.e. by having the database returning a notification in case of attempting such access), or they are aware of the situation and terminate the original session and create a target session.

Write Access Original Sessions:

Table Insert:

New data record can be written to original data structures. A copy of the record is created for the target applications by transforming the new record to the target structure and persist with the target persistence.

Forbidden—Table Update of data inserted by target session:

The application will receive an exception to logon again. This is indicated by the reverse write locks that are set by the target system and thus exclude these data sets from updates of the original application.

Writing to a target record will possible leave inconsistent data if additional fields have been filled by a target session, regardless of whether fields are optional or mandatory.

A session can end with the commit of a transaction. The session input parameters are moveable to the target session. The target session can be created automatically for the user. The point in time of the original session termination can be selected such that the transfer of the session input parameters is possible and, consequently, the target session state can be constructed only on the basis of the session input parameters without semantical loss of information compared to the original session.

Read Access Target Sessions:

Read directly from the already transformed target data structures

Write Access Target Sessions:

Insert: Write to target data structures, and original sessions will not be able to read this data, which is acceptable given the limited amount of time that original session may require access to this data.

Update of data inserted by original session (originating from original persistence). The process entails:

(1) Write to target data structures (2) Determine original data set and set write lock to original data set.

Steps (1) and (2) above must be treated as one transaction, e.g. a read from an original session to the to-be-updated record must not happen between inserting new record into target persistence and locking the old record at the original persistency. If this temporary data inconsistency cannot be accepted, the updated record has to be deleted from the original persistency.

Figure 4:
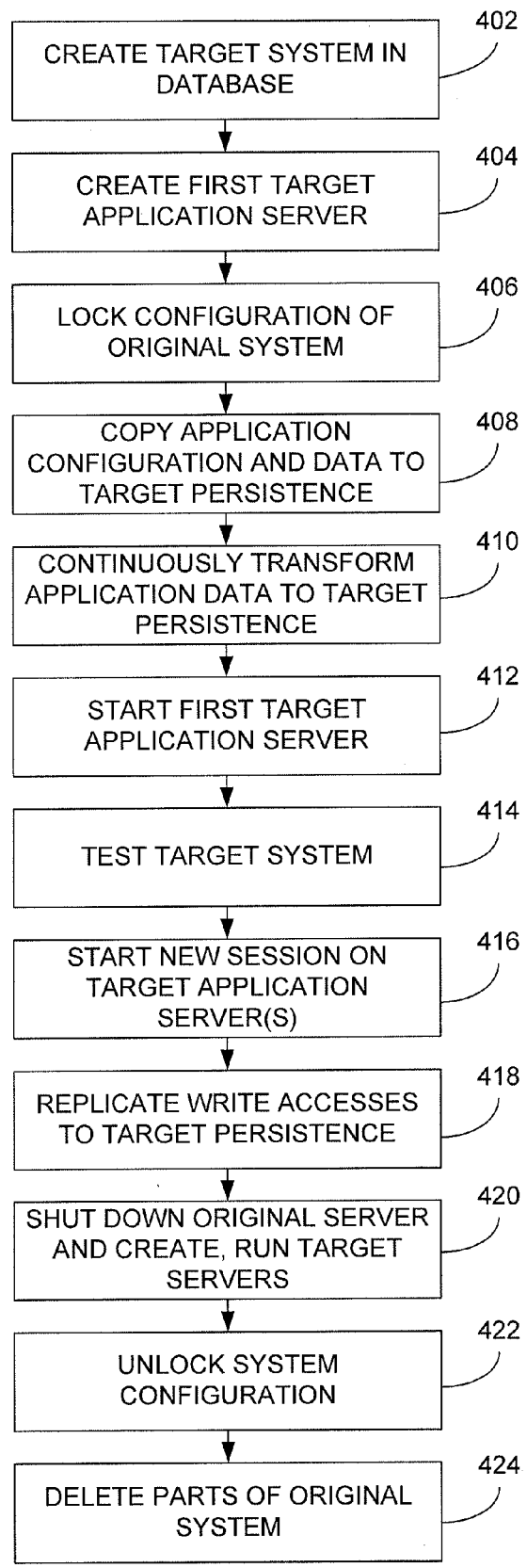
FIG. 4 is a flowchart of a method for upgrading a multi-version system for zero-downtime upgrade.

FIG. 4 is a flowchart of a method 400 for upgrading multi-version database and application systems with zero downtime. At 402, the target system including a persistence is created in a database, and at 404 the first target application server is created. At 406, the configuration of the original system is locked in order to prevent changes to the configuration of the original system. At 408, application configuration and upgrade-affected application data is copied and transformed to the target persistence, and at 410 and following, the upgrade-affected application data is continuously transformed to the target persistence.

At 412 the first target application server is started and run. At 414, the target system is tested, as described above. New sessions are thereafter only started on the target application servers, at 416. At 418, write accesses to the original persistence are replicated to the target persistence as well, and write accesses to the target persistence lock the corresponding record of the original persistence. At 420, the depleted original server is shut down, and a target application server is created, started and run. Thus, each original server is exchanged for a tartet server. At 422, the system configuration is unlocked when the last original server is terminated. Finally, at 424, superfluous and still-remaining parts of the original system are deleted. Accordingly, the method 400 allows for an upgrade of a multi-version system without downtime to productive use of the system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for upgrading an application system without downtime, the application system having a database and a plurality of original application core servers, the method comprising:
    creating, by one or more processors, a target system in a database, the target system having a persistence;
    creating, by one or more processors, a set of target application servers in the target system, the set of target application servers keeping a sum of original application core servers and target servers constant;
    locking, by one or more processors, each of the plurality of original application core servers to prevent configuration changes to the application system;
    copying, by one or more processors, configuration data and application data associated with one of the plurality of original application core servers to the persistence associated with the target system, the configuration data and application data remaining accessible from the plurality of original application core servers;
    running, by one or more processors, each of the set of target application servers after the configuration data and application data associated with an associated one of the plurality of original application core servers is copied and transformed to the persistence associated with the target system; and
    distributing, by one or more processors, new requests to the application system from each of the plurality of original application core servers to one of the target application servers in the target system, the new requests comprising a request for a singleton exclusive to a target application server of the set of target application servers.

2. The method in accordance with claim 1, further comprising replicating, by one or more processors, write accesses to the one original application core server to the persistence associated with the target application servers.

3. The method in accordance with claim 2, further comprising shutting down, by one or more processors, the one original application core server while starting and running the first target application server.

4. The method in accordance with claim 3, further comprising deleting, by one or more processors, the one original application core server.

5. A non-transitory computer program product comprising a machine-readable medium storing instructions that, when executed by at least one programmable processor, cause the at least one programmable processor to perform operations comprising:

creating a target system in a database, the target system having a persistence;

creating a set of target application servers in the target system, the set of target application servers keeping a sum of original application core servers and target servers constant;

locking each of the plurality of original application core servers to prevent configuration changes to the application system;

copying configuration data and application data associated with one of the plurality of original application core servers to the persistence associated with the target system, the configuration data and application data remaining accessible from the plurality of original application core servers;

running each of the set of target application servers after the configuration data and application data associated with an associated one of the plurality of original application core servers is copied and transformed to the persistence associated with the target system; and distributing new requests to the application system from each of the plurality of original application core servers to one of the target application servers in the target system, the new requests comprising a request for a singleton exclusive to a target application server of the set of target application servers.

6. The non-transitory computer program product in accordance with claim 5, further comprising replicating, by one or more processors, write accesses to the one original application core server to the persistence associated with the first target application server.

7. The non transitory computer program product in accordance with claim 6, further comprising shutting down, by one or more processors, the one original application core server while starting and running the first target application server.

8. The non-transitory computer program product in accordance with claim 7, further comprising deleting, by one or more processors, the one original application core server.

9. A system comprising:

at least one memory; and at least one processor operably coupled to the at least one memory, the at least one processor configured to perform operations comprising:

creating a target system in a database, the target system having a persistence;

creating a set of target application servers in the target system, the set of target application servers keeping a sum of original application core servers and target servers constant;

locking each of the plurality of original application core servers to prevent configuration changes to the application system;

copying configuration data and application data associated with one of the plurality of original application core servers to the persistence associated with the target system, the configuration data and application data remaining accessible from the plurality of original application core servers;

running each of the set of target application servers after the configuration data and application data associated with an associated one of the plurality of original application core servers is copied and transformed to the persistence associated with the target system; and distributing new requests to the application system from each of the plurality of original application core servers to one of the target application servers in the target system, the new requests comprising a request for a singleton exclusive to a target application server of the set of target application servers.

10. The system in accordance with claim 9, wherein the operations further comprise replicating write accesses to the one original application core server to the persistence associated with the first target application server.

11. The system in accordance with claim 10, wherein the operations further comprise shutting down the one original application core server while starting and running the first target application server.

12. The system in accordance with claim 11, wherein the operations further comprise deleting the one original application core server.

\* \* \* \* \*